G. STETTLER.
Cheese-Turner.

No. 215,407.  Patented May 13, 1879.

WITNESSES:
W. W. Hollingsworth
Amos W. Hart

INVENTOR:
G. Stettler
BY
ATTORNEYS.

UNITED STATES PATENT OFFICE.

GOTTLIEB STETTLER, OF NORTH GEORGETOWN, OHIO.

IMPROVEMENT IN CHEESE-TURNERS.

Specification forming part of Letters Patent No. 215,407, dated May 13, 1879; application filed February 3, 1879.

*To all whom it may concern:*

Be it known that I, GOTTLIEB STETTLER, of North Georgetown, in the county of Columbiana and State of Ohio, have invented a new and Improved Cheese-Turner; and I do hereby declare that the following is a full, clear, and exact description of the same.

In the manufacture of cheese, more particularly the variety known as "Swiss," the cheeses require to be daily turned. When this is done manually, much time and labor are required, and hence revolving frames have been employed to economize both.

My invention is an improvement in this class of apparatus; and consists in a cheese-holding frame provided with journals having rollers applied thereto, which run on parallel horizontal beams or ways, of such length that a series of such frames may be supported on them and revolved and shifted in position for the purpose of turning the cheeses placed on the shelves of the frames.

Figure 1:
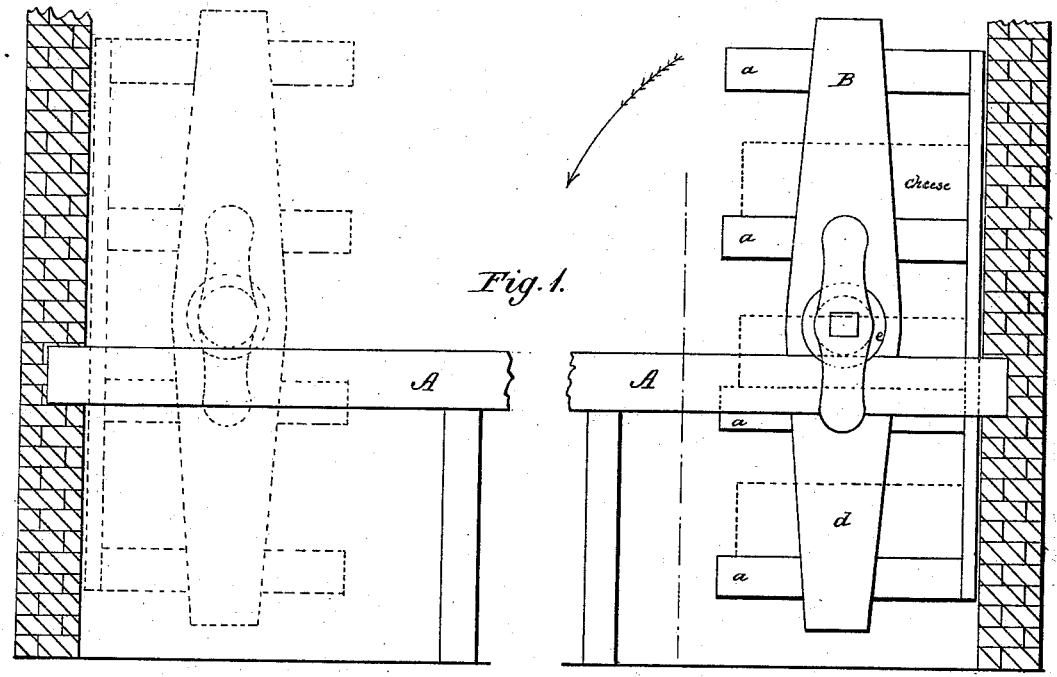
Figure 2:
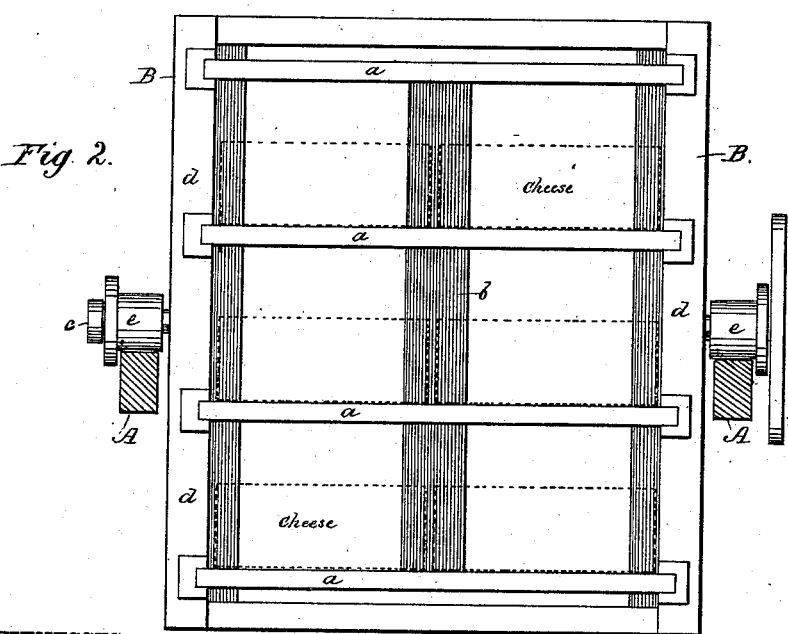

In the accompanying drawings, forming part of this specification, Figure 1 is a side elevation of my improved apparatus. Fig. 2 is a vertical cross-section on line $x$ $x$ of Fig. 1.

A A indicate parallel horizontal beams or ways, which may be supported by legs or other means. B is the cheese-turner proper, which consists of an oblong rectangular open frame having a series of sliding or removable transverse shelves, $a$, for holding cheeses, and a back piece, $b$, for preventing the latter falling off the shelves when the frame is revolved.

A journal, $c$, is fixed in the middle of each of the side bars, $d$, of the frame B, and a flanged roller, $e$, is applied to each journal, as shown. The said rollers run on the ways A, and hence the frame may be easily shifted in position by pushing it along from one end of the ways to the other.

The frame B is held vertical, when at rest, by being pushed back against the wall of the cellar or room in which the apparatus is placed, and when it is desired to turn the cheeses resting on its shelves $a$ the frame is drawn forward on the ways A and revolved a half-revolution, thereby causing each cheese to fall upon the shelf which was previously above it, so that what was before the top of a cheese becomes its bottom, as will be readily understood.

In practice, a series of frames, B, is placed on each pair of ways A, and as the first one is turned it is pushed back against the wall, and the next against the first, and so on until all have been turned and are placed close together, so as to remain in vertical position.

At the next operation I begin to turn the frames at that end of the series where I left off the day before, and push the frames successively back against the opposite wall.

What I claim is—

The combination of the cheese holding and turning frame and its rollers with the horizontal parallel ways on which it is supported, turned, and shifted in position, as shown and hereinbefore described.

GOTTLIEB STETTLER.

Witnesses:
 DAVID RATZLY,
 LYMAN SOMERS.